US008448076B2

(12) United States Patent
Hammack et al.

(10) Patent No.: US 8,448,076 B2
(45) Date of Patent: May 21, 2013

(54) CONFIGURING ANIMATIONS AND EVENTS FOR OPERATOR INTERFACE DISPLAYS IN A PROCESS CONTROL SYSTEM

(75) Inventors: Stephen Gerard Hammack, Austin, TX (US); Bruce Hubert Campney, Pflugerville, TX (US); Jose Amilcar G. Reyes, Bedok (SG); Ryan G. Valderama, General Trias (PH)

(73) Assignee: Fisher-Rosemount Systems, Inc., Austin, TX (US)

( * ) Notice: Subject to any disclaimer, the term of this patent is extended or adjusted under 35 U.S.C. 154(b) by 553 days.

(21) Appl. No.: 12/430,190

(22) Filed: Apr. 27, 2009

(65) Prior Publication Data

US 2010/0275139 A1    Oct. 28, 2010

(51) Int. Cl.
    *G06F 3/048* (2006.01)
(52) U.S. Cl.
    USPC .......................................... 715/763; 715/764
(58) Field of Classification Search
    USPC ................................................ 715/763, 764
    See application file for complete search history.

(56) References Cited

U.S. PATENT DOCUMENTS

| | | | | |
|---|---|---|---|---|
| 5,883,639 | A * | 3/1999 | Walton et al. ................. | 345/473 |
| 7,089,530 | B1 * | 8/2006 | Dardinski et al. ............ | 717/105 |
| 7,110,835 | B2 | 9/2006 | Blevins et al. | |
| 7,680,546 | B2 | 3/2010 | Gilbert et al. | |
| 2003/0023961 | A1 * | 1/2003 | Barsness et al. .............. | 717/152 |
| 2005/0188320 | A1 * | 8/2005 | Bocking ....................... | 715/752 |
| 2005/0257204 | A1 * | 11/2005 | Bryant et al. ................. | 717/163 |
| 2006/0036965 | A1 * | 2/2006 | Harris et al. .................. | 715/777 |
| 2006/0143570 | A1 | 6/2006 | Washington et al. | |
| 2007/0124693 | A1 * | 5/2007 | Dominowska et al. ....... | 715/772 |

(Continued)

FOREIGN PATENT DOCUMENTS

| | | |
|---|---|---|
| GB | 2 429 389 A | 2/2007 |
| WO | WO-2008/040455 A1 | 4/2008 |
| WO | WO-2010/037146 A2 | 4/2010 |

OTHER PUBLICATIONS

Microsoft Computer Dictionary, defniition of "hierarchy" 2002, pp. 319-320.*

(Continued)

*Primary Examiner* — Kieu Vu
*Assistant Examiner* — Eric J Bycer
(74) *Attorney, Agent, or Firm* — Marshall, Gerstein & Borun LLP

(57) ABSTRACT

A graphical editor for creating operator displays and configuring control strategies in a process control plant or system may present a coherent view for the multiple graphical or control strategy items depicted within or associated with the display and strategy. For each graphical item, the view may hierarchically show default and modified values, animation expressions, and event handler scripts. The view may allow a configuration engineer to group, order, and filter various graphical or control strategy items within a single display to present a cohesive view of how the multiple items within the display are capable of being configured for events, animations, and control strategies within the operator display. Providing this cohesive view may allow the user to view and configure graphical items and control strategies without having to open and dismiss dialogs for each configuration task.

48 Claims, 11 Drawing Sheets

U.S. PATENT DOCUMENTS

| | | |
|---|---|---|
| 2007/0132779 A1 | 6/2007 | Gilbert et al. |
| 2007/0139441 A1* | 6/2007 | Lucas et al. ............... 345/619 |
| 2007/0165031 A1 | 7/2007 | Gilbert et al. |
| 2007/0168065 A1 | 7/2007 | Nixon et al. |
| 2007/0211079 A1 | 9/2007 | Nixon et al. |
| 2007/0240069 A1 | 10/2007 | Eldridge et al. |
| 2008/0091279 A1 | 4/2008 | Biermann et al. |
| 2008/0216007 A1* | 9/2008 | Brockbank et al. ........... 715/771 |

OTHER PUBLICATIONS

"Office New User Experience: UI Style Guide for Solutions and Add-Ins," Microsoft Office, May 2006, 14 pages.

Search Report for Application No. GB1006581.1, dated Jul. 8, 2010.

Search Report and Written Opinion for European Patent Application No. 10161191.1 dated Oct. 13, 2011.

* cited by examiner

CONFIGURING ANIMATIONS AND EVENTS FOR OPERATOR INTERFACE DISPLAYS IN A PROCESS CONTROL SYSTEM

TECHNICAL FIELD

The present invention relates generally to process plants and, more particularly, to configuring animations of components and various activities associated with plant configuration, control, maintenance, and simulation.

DESCRIPTION OF THE RELATED ART

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, like the FOUNDATION™ Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, that are objects in an object oriented programming protocol and perform functions within the control scheme based on inputs thereto and provide outputs to other function blocks within the control scheme. The configuration application may also allow a designer to create or change operator interfaces or human-machine interfaces (HMI) which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc.

Some process control configuration applications that are supported by graphical display applications presently include a library of template objects, such as function block template objects and, in some cases, control module template objects, that are used to create a control strategy for a process plant. The template objects have default properties, settings and methods associated therewith that are associated with the object's visual appearance and animation. Using a graphical configuration application, the engineer can select these template objects and essentially place copies of the selected template objects into a configuration screen to develop a control module. The template objects may also include one or more sub-elements or primitives of the template object. For example, a furnace template object may include a valve, valve fitting, and various text areas as sub-elements. During the process of selecting and placing the template objects into the configuration screen, the engineer interconnects the inputs and outputs of these objects and changes their default parameters, names, tags, and other properties to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create and animate one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally preconfigured to display, in known manners, information or data received from the process control modules or the devices within the process plant. In some systems, displays are created by a graphic depiction that represents a physical or a logical element and that is communicatively tied to the physical or logical element to receive data about the physical or logical element.

Thus, similar to the control configuration application, the display creation application may have template graphical display items, such as tanks, valves, sensors, operator control buttons like slide bars, on/off switches, etc. which may be placed on a screen in any desired configuration to create an operator display, maintenance display and the like. The template graphical display items often include numerous nested sub-elements to create a graphical item. For example, a tank template graphical display includes a pump and that pump may include numerous sub-elements such as an ellipse, rectangles, lines, or other items. When placed onto the screen, individual graphic items may be interconnected on the screen in a manner that provides some information or display of the inner-workings of the process plant to users. To animate the graphic display, the display creator must manually tie each of the graphical items to data generated within the process plant, such as data measured by sensors or indicative of valve positions, etc. by specifying a communication link between the graphic item and the relevant data source within the process plant. The user may also configure one or more animation parameters such as values, styles, and animation expressions to manage input and output display ranges (e.g., a fill percentage for a rectangle that visually represents a tank element within a process control plant, a flame length for an animation that visually represents a burner setting within the plant, etc.). The user may also configure event handler scripts. For example, an event may include a mouse click or pointer movement and an associated handler script may determine how the display should change or not change (i.e., "handle" the associated event) if that event occurs while a graphical item configured for that event is currently displayed. For example, a "mouse hover" event where a user places a mouse or other pointer over a graphical item for a short amount of time may trigger an event handler script associated with that event to display further information about the graphical item or change the graphical item. In one embodiment, a "mouse hover" event handler script may be configured during configuration time to display real-time process parameters associated with the graphical item at runtime when a user places a pointer over the item. The graphical items associated with the animations and events may then change in response to data communicated from associated process control plant and system elements and user events to illustrate, for example, that a tank is half full, to illustrate the flow measured by a flow sensor, to react to or "handle" runtime user events, etc.

While the control template objects within the control configuration application and the display items within the display creation application are convenient because they can be copied and used to create many different control modules and graphical displays, there is often a need to associate default animations or event handler scripts with many of the same control modules and graphical displays for different equipment within the process plant. For example, many medium to large sized process plants have numerous instances of the same or similar equipment that can be controlled and viewed using the same basic general control module and display. Further, a user or configuration engineer may create a more accurate or realistic representation of the process control plant and system by re-configuring the default configurations associated with the graphical items. To animate these numerous control modules and displays, however, a general control module or display module is created and animated and this general control or display module is then copied for each of the different pieces of equipment for which it is applicable. Some general techniques for integrating and using a graphic display editor and graphic display elements at a system level of a process control and simulation system may be described in U.S. patent application Ser. No. 10/590,574 entitled "GRAPHICAL ITEM WITH MULTIPLE VISUALIZATIONS IN A PROCESS CONTROL ENVIRONMENT" filed on Aug. 22, 2006,the entire disclosure of which is hereby incorporated by reference herein. These techniques generally enable the creation, animation, and use of graphical items in various activities associated with plant configuration, control, maintenance, and simulation. The graphical items are re-useable and re-configurable for any process, simulation, or task within the process control system.

During the configuration of a process control and simulation system using a graphic display editor, a configuration engineer must often assign and configure actions or animations, and event handler scripts to the various graphical items. These animations and event handler scripts provide a visual representation of activities taking place at an element within the process control plant or system to provide a realistic and interactive display for the user. Typically, the engineer will access a new dialog window within a graphics editor to configure an animation or event script for each possible user action associated with an animation. Also, to configure DeltaV™ Control Strategies, the user or engineer must open and dismiss a dialog within a control strategy editor to modify each action, transition, converges, deconverges, etc., associated with control module (e.g., Sequential Function Charting (SFC) algorithms, function blocks, recipes, procedures, and other control strategies). In short, to configure events and animations, the user or engineer must access a multiple dialog windows corresponding to multiple events and animations associated with a graphical item. In typical systems, a configuration engineer must access a context menu, perform a double click action with a mouse or other pointer, select or hover the pointer over a toolbar button, and enter data to configure the animation or script. After configuring the animation or event, the engineer must then dismiss the dialog window, for example, by selecting an OK, Cancel, or another button on the configuration window corresponding to the event or action. Furthermore, multiple actions are often configured for each graphical item within the display or the other graphical items needed for the display. Because the dialog window may only be accessed for each event or animation individually, it may be difficult or impossible for the configuration engineer to discern at once the configuration of all events and animations associated with one or more graphic items depicted in the display, or the display configuration, generally.

SUMMARY OF DISCLOSURE

A graphic display editor or control strategy editor for creating operator displays, configuring control strategies, and other event and animation editing in a process control plant or system may present a coherent view for the multiple graphical or control strategy items depicted within or associated with the display and strategy. For each graphical item, an animation view may show, in a hierarchical manner, properties of the graphical item such as default and modified values, animation expressions, event handler scripts, and other viewable or modifiable characteristics of the graphical item and its sub-elements. The animation view may allow a configuration engineer to group, order, and filter various configurations of the graphical item properties within a single display to present a cohesive view of how the graphical items within the display have been or are capable of being configured for event handling and animation presentation within the operator display. Further, when configuring a control strategy within the process control plant, a control strategy view may allow the user to view quickly view and configure control strategies without opening an closing a dialog for each configuration task. Providing a cohesive, hierarchical view may facilitate graphics and control strategy configuration tasks by organizing and presenting the relevant graphics and control strategy information for the user to reduce or eliminate opening and dismissing dialogs for each task.

One example of a graphic display editor for use in a process plant to configure animations and events for operator interface displays may include a library of graphical items, one or more sections to display the items, and functions to manipulate the items. The graphical items may include one or more user-configurable properties associated with a physical or a logical entity within the process control plant. A first section of the editor may display a graphical item that includes one or more user-configurable properties. A second section of the editor may hierarchically display the one or more user-configurable properties. A plurality of user-selectable functions may also be configured to display the one or more user-configurable properties in the second section to facilitate completion of a graphical item configuration task using the editor. The editor may also display the graphical item and the one or more user-configurable properties simultaneously.

The editor as herein described may also configure an animation or event for a graphical representation of process control plant entity in a process control plant operator display by displaying, in a diagram view of an animation view editor, a selected graphical item that may include a visual representation of a physical or a logical entity within the process control plant and one or more sub-elements having one or more user-configurable properties for one or more of the animation or the event. The editor may further configure the graphical representation by displaying the one or more user-configurable properties of the selected graphical item in an animation pane of the editor and arranging the displayed user-configurable properties in the animation pane to facilitate completion of a configuration task.

A computing system including a display and a graphical editor may also include a configuration module for configuring animation and event properties of graphical items displayed at an operator workstation of a process control plant. The configuration module may be configured to display a selected graphical item in a diagram view of a graphical item editor. The selected graphical item may include a visual representation of a physical or a logical entity within the process control plant and one or more sub-elements having one or more user-configurable properties. The module may also be configured to display the one or more user-configurable properties of the selected graphical item in an animation pane of the editor and arrange the displayed user-configurable properties in the animation pane to facilitate completion of a graphical item configuration task. After configuration of the graphical item, the module may store the configured graphical item. The one or more user-configurable properties may also include one or more of an event handler script, an animation expression, an animation value, an animation converter, and a property value.

DETAILED DESCRIPTION

Figure 1:
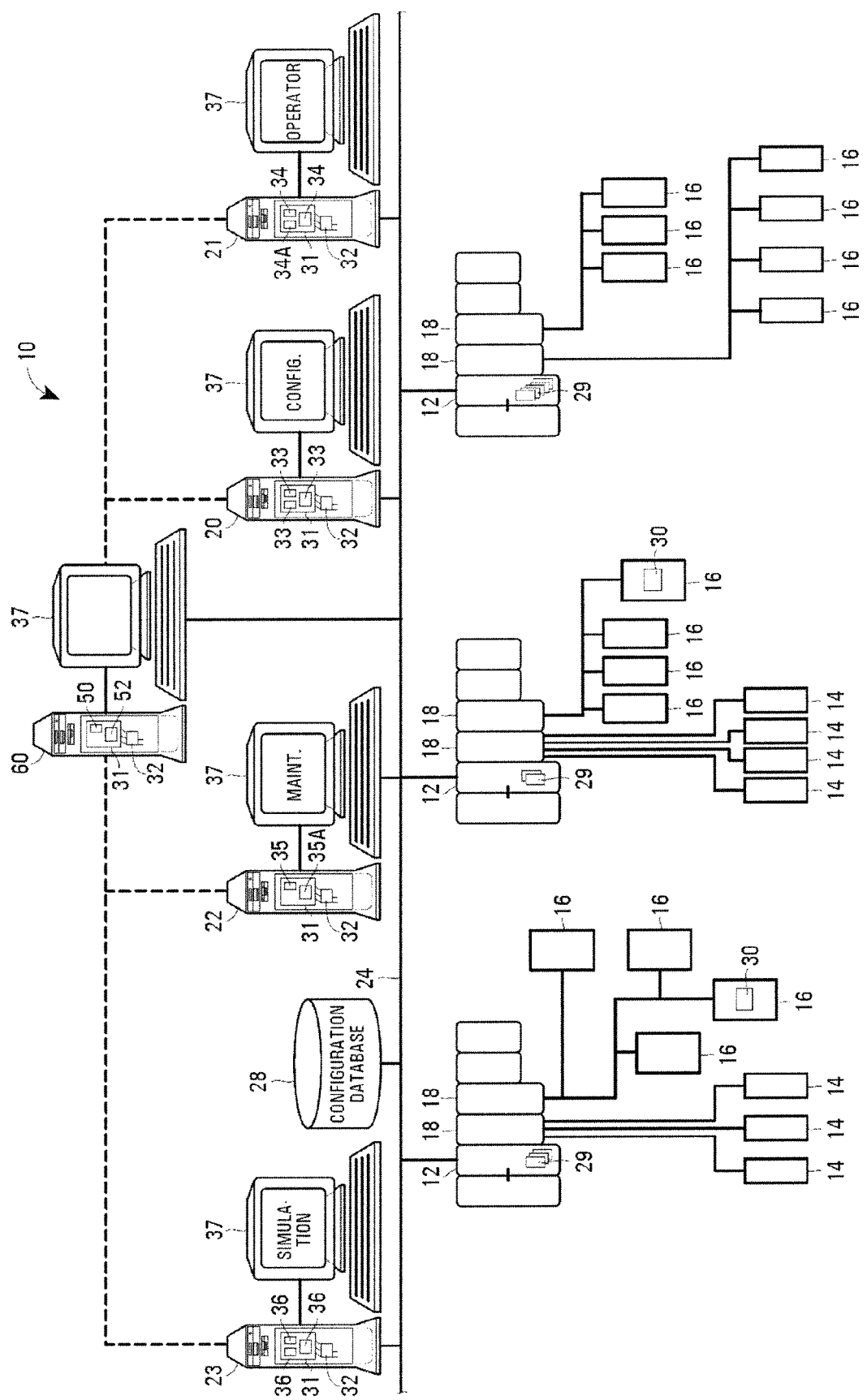
FIG. 1 is a block diagram of a distributed process control network located within a process plant including operator workstations that implement display routines and other applications associated with various functions within the process plant, as well as a workstation that provides system level graphical support that may be used to create and animate graphical items and graphic displays for each of the various functional areas of the plant.

FIG. 1 illustrates an example process plant 10 in which system level graphical support is provided to various functional areas of the plant 10. As is typical, the process plant 10 includes a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 24 which may be, for example, an Ethernet link. A database 28 may be connected to the data highway 24 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects created in the manner described herein to provide graphical support within the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller or maintenance personnel. However, in some cases, handheld devices may be used to implement these functions and these handheld devices are typically carried to various places in the plant.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV™ system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface applications and other data structures which can be accessed by any authorized configuration engineer to create and download control routines or modules, such as the control modules 29 and 30, to the various controllers 12 and devices 16 of the plant 10. The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34a such as control diagnostic applications, tuning applications, report generation applications or any other control support applications that may be used to assist a control operator in performing control functions. Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35a such as maintenance diagnostic applications, calibration applications, vibration analysis applications, report generation applications or any other maintenance support applications that may be used to assist a maintenance person in performing maintenance functions within the plant 10. Additionally, the workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. As is typical, each of the workstations 20-23 includes a display screen 37 along with other standard peripheral devices, like a keyboard, a mouse, etc.

Of course, while the various configuration, control, maintenance and simulation applications 33-36 are illustrated in FIG. 1 as being located in different workstations dedicated to one of those functions, it will be understood that the various applications 33-36 associated with these or other plant functions may be located in and executed in the same or different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

A graphical support layer is provided at a system level of the process plant 10 to support the graphic display and data structure needs of each of the various functional areas of the plant 10, including the configuration, operator viewing, maintenance viewing, simulation and other functional areas of the plant 10. This system level of support is depicted diagrammatically in FIG. 2, which illustrates a plant operational level 40, a plant functional level 42 and a system level 44. As will be understood from FIG. 2, the plant operational level 40 includes the controllers 12, field devices 14, 16, etc. which execute the control routines or modules 29 and 30, as well as other software run within the plant 10 to implement plant operations during runtime of the plant. The plant functional level 42 is depicted as including a configuration function block 46, a control function block 47, a maintenance function block 48 and a simulation block 49, although other or different functions, such as an engineering and a business function, could be provided as well. The configuration function block 46 implements the configuration routines 33 which interface or communicate with components within the plant operational level 40 to provide control strategies or control modules thereto. The control function block 47 includes the control viewing and other applications 34 and 34*a* which also interface or communicate typically directly with the various physical and logical components within the plant operational level 40 to implement operator initiated changes within the plant 10, to provide information to the operator via control displays 34, to acquire data for the control applications 34*a*, etc. The maintenance function block 48 includes the maintenance routines and applications 35 and 35*a* that interface or communicate with various physical and logical components within the plant operational level 40 to implement maintenance procedures, to collect maintenance data, to provide maintenance data or information to a maintenance person via maintenance displays 35, to run diagnostic applications 35*a*, etc. Likewise, the simulation function block 49 includes simulation routines 36 which implement simulations of the plant 10 and which may be communicatively coupled to components within the plant operational level 40 to obtain data regarding the plant 10.

Figure 2:
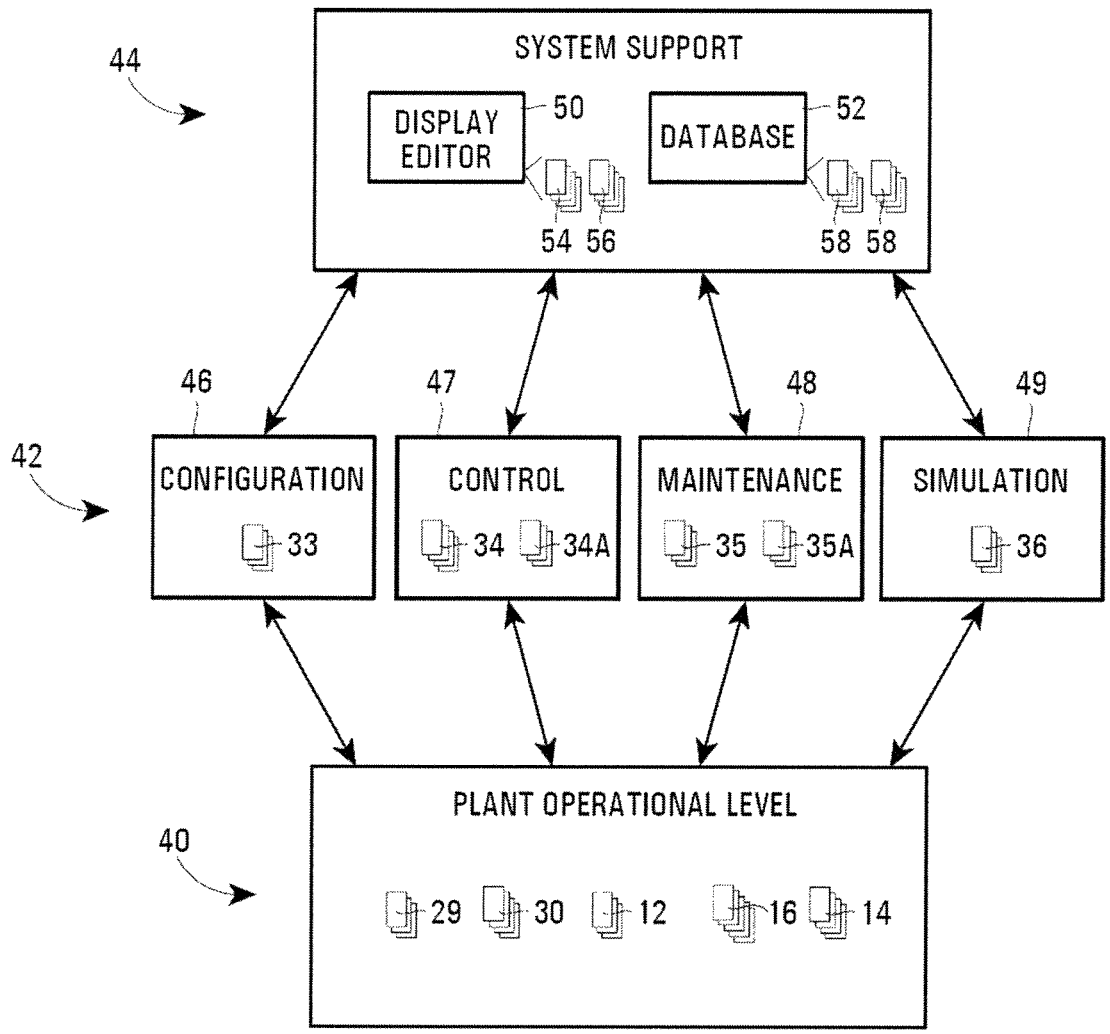
FIG. 2 is a logical block diagram illustrating the integration of system level graphical support within a process plant control, viewing and simulation system.

As illustrated in FIG. 2, the system level support layer 44 ties into and supports each of the function blocks 46-49 within the plant functional layer 42 to enable, for example, the creation and maintenance of common database and display structures, such as software objects, graphical items and graphic displays for use in the various functional areas 46-49. More particularly, the system level support layer 44 includes application, database and graphical support elements that enable the graphical activities performed in each of the function blocks 46-49 to be integrated together, or to be developed using common database structures and graphical items created at the system support layer 44.

The system support layer 44 may include a graphical editor 50 and a graphical object database 52. The editor 50 may be used to create graphical items 54 and graphic displays 56, while the graphic object database 52 stores the elements 54 and displays 56 in a memory accessible by the editor 50 and by the various applications in the blocks 46-49. The database 52 may also store other objects 58 such as sub-elements for graphical items 54, and data structures that connect the graphical items 54 to individual hardware and software elements within the plant operational level 40. Additionally, the database 52 may store graphical items, display templates, sub-elements, or primitives that may be used to create further graphical items, graphical items, or displays. As will be understood from FIG. 2, the graphic display elements 54, displays 56 and other database structures 58 may be used by any and all of the functional blocks 46-49 to create and use graphics associated with those functional blocks.

Referring again to FIG. 1, the system level support block 44 may be implemented using an additional workstation or user interface 60 which may be connected to each of the other workstations 20-23. The workstation 60 may generally store the graphic display and item editor 50 and database 52 and may store the other elements 54, 56 and 58 if so desired. Additionally, the workstation 60 may be communicatively connected to the workstations 20-23 via the databus 24, via separate wired or wireless communication connections (illustrated by dotted lines in FIG. 1) or in any other desired manner. In the configuration illustrated in FIG. 1, the workstation 60 stores and executes the graphic display and item editor 50 to enable a user to create and animate graphical items and to group the items into one or more graphic displays or display modules. These display modules may be then stored in the database 52 to be accessed and used by various functional blocks 46-49 illustrated in FIG. 2 and implemented on the various workstations 20-23. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the editor 50 may be stored in and executed on any of the other workstations 20-23 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as graphical items and graphic displays. Graphical items are generally primitive or low level display objects that are associated with a particular physical entity within the plant, such as a hardware device like a valve, a sensor, a pump, a controller, a tank, a reactor, a burner, a pipe, a pipe fitting, etc. Graphic displays are generally made up of a set of interconnected graphical items and are used to represent and model more complicated sets of hardware within a plant, such as a unit, an area, etc. and include interconnections between different hardware units. Graphical items may be nested in that each item made up of a plurality of sub-elements that may, themselves, be graphical items. For example, a reactor may include one or more valves, pipe fittings, sensors, etc., that may include even simpler elements such as rectangles, ellipses, etc. The graphic displays may include one or more graphical items, as well. Additionally, graphic displays may include graphs, charts and other data provided from the plant, from other applications, such as diagnostic and business applications running in the workstations 20-23 and 60, etc.

Figure 3:
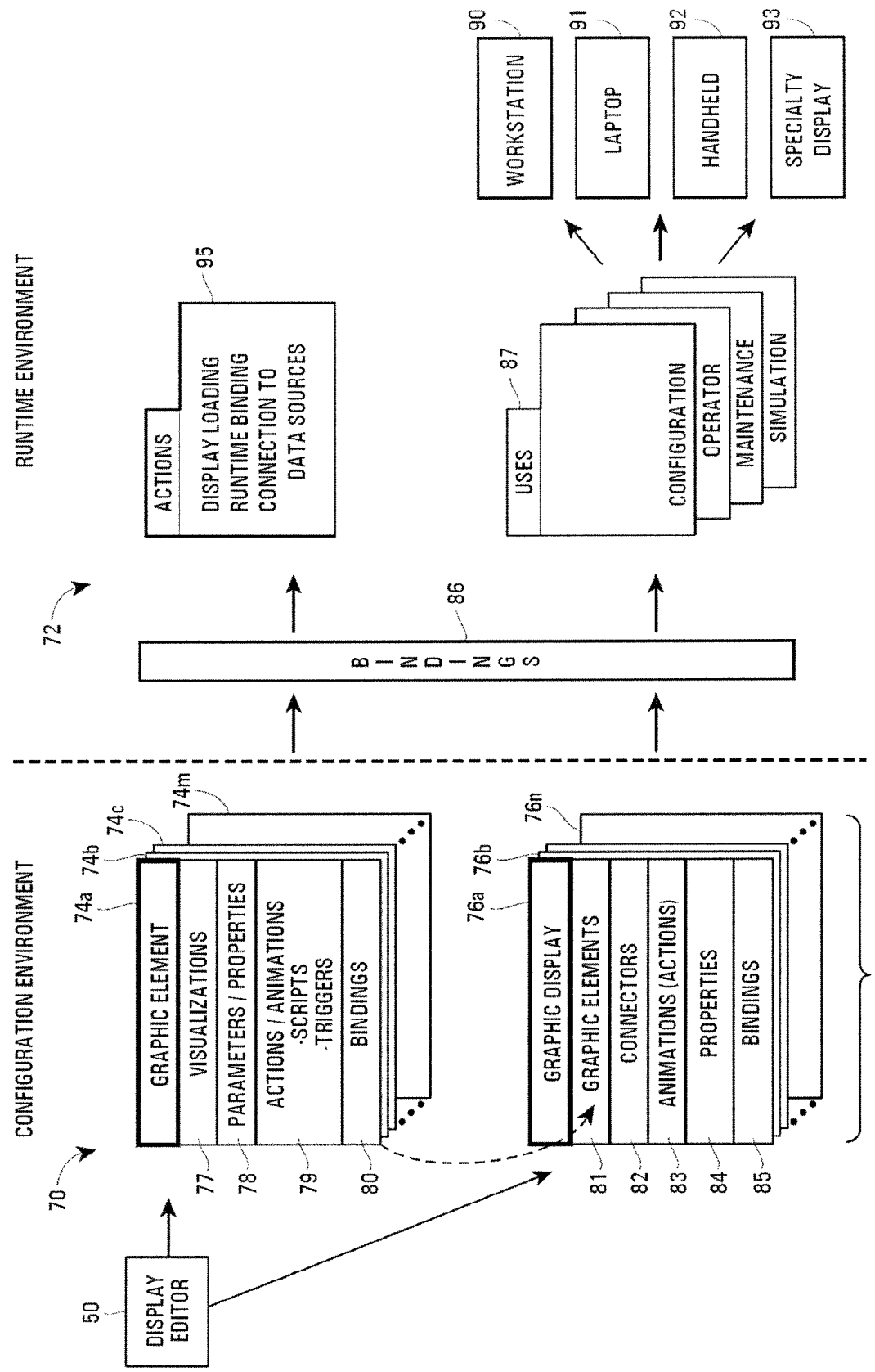
FIG. 3 is a logical diagram illustrating a configuration environment in which graphical items and displays are created and a runtime environment in which graphical items and displays may be executed.

FIG. 3 generally illustrates the development and use of graphical items and graphic displays in two environments in which these elements and displays may exist, in particular, a configuration environment 70 and a runtime environment 72. Generally speaking, display objects in the form of graphical items 74 (depicted as separate element objects 74*a*, 74*b*, etc.) and graphic displays 76 (depicted as separate display objects 76*a*, 76*b*, etc.) are created in the configuration environment 70 using, for example, the editor 50. After being created, the objects 74 and 76 may be stored in the database 52. The objects 74 and 76 may be created as class objects, referred to herein as display class objects, that define a generic object not bound or tied to specific hardware or logical elements within the process plant 10. However, class objects can be used to create runtime graphical objects having the same basic properties as the class objects, but are tied or bound to specific hardware within the process plant 10. Generally speaking, however, class objects remain tied to the children objects instantiated therefrom, so that changes to the class objects can be automatically propagated to the children objects, even when these children objects are instantiated within a runtime environment.

As illustrated in FIG. 3, each of the graphical items 74 includes a number of components that make the graphical item useful in many different contexts. In particular, each graphical item 74 includes one or more visualizations 77, any number of parameters or properties 78, any number of actions or animations 79 which may be implemented using scripts or triggers, and bindings 80. Generally speaking, each visualization 77 defines the visual properties or elements to be actually displayed on a display screen when the graphical item 74 is implemented in the runtime environment 72. Typically, visualizations define a representation of a physical or logical device or group of devices, although a visualization could represent other entities. Visualizations 77 may be implemented in the runtime environment 72 using any desired description or programming paradigm that defines the specifics of the graphical depiction of an entity. In one embodiment, the visualizations 77 may be implemented using PGXML, XAML, or Windows Presentation Foundation (WPF—formerly named "Avalon") controls, which are well known controls provided by Microsoft® and which, because they are object based, are easily implemented in standard Windows® type displays and portable between display environments.

Generally speaking, the parameters and properties 78 define variables or other properties such as static or changeable intrinsic properties, associated with the item or entity being depicted by the visualization and these properties are definable by the creator of the item 74. Likewise, the actions and animations 79 define routines or programs (which may be implemented as event handler and animation scripts and expressions which perform transforms on properties, which detect conditions of a process entity based on property values, etc.), animation routines which may include any routines that change the graphic visualization or behaviors to be performed on or using the visualization 77 when the visualization 77 is depicted on a display screen, or routines which enable a user to use or interact with the visualization 77 to cause a change in the process, such as a change to an input to the process. These actions and animations provide the visualization 77 with more interesting, understandable or helpful graphical properties and to allow the user to interact with the visualization 77. In one case, these events, actions or animations may take the form of changes in color, size (e.g., height and width, line size, fonts, etc.) of various components of the visualization, color fills, and animations such as changes in color, rotations, changes in size and scaling, skewing, etc., and changes in the behavior of a visualization upon an action such as a mouse click, pointer hover, or other event. These events, actions and animations provide graphical properties as well as user interaction properties to the graphic item 74.

The bindings 80, which may be static or fixed bindings or bindings which use aliases, define the manner in which the parameters or properties 78 are to be bound to data, tags or other entities within the runtime environment 72 when the graphical item 74 is implemented as part of a display in the runtime environment 72. Generally, the bindings 80 for each graphical item 74 establish the manner in which the graphical item 74 is tied to one or more entities or data elements defined elsewhere in the plant environment, and thus define an interface between the actual runtime environment 72 and the graphical item 74.

As illustrated in FIG. 3, each of the graphic display objects 76 includes numerous components, such as a reference to or a copy of one or more graphical items 81, connector elements 82, actions and animations 83, properties 84 and bindings 85. Generally speaking, a graphic display 76 may be a display that depicts the interaction of various graphical items 81 that may be visually connected together with connector elements 82 representing pipes, lines, conveyor belts, etc. Such connector objects are described in U.S. Pat. No. 7,110,835. A dotted line in FIG. 3 illustrates a reference to one of the graphical items 74 by the graphic display object 76*a*. It will be understood that the graphic display 76 that references a graphical item 74 includes all of the properties, parameters, events, actions and animations, etc. of that graphical item 74. Similar to the graphical items 74, each graphic display 76 may include one or more additional actions or animations associated therewith that perform, for example, animations on the display, user interface interactions, data manipulations, etc. Likewise, each graphic display 76 may include any number of properties associated with the display, and typically these properties define properties of units, areas, or other groups of elements depicted within the display. Of course, the bindings 85 define the manner in which the graphic display 76 is tied to one or more entities or data elements defined elsewhere in the plant environment and thus define an interface between the actual runtime environment 72 and the graphic display 76.

Once created, the graphical items 74 and the graphic displays 76 may be bound to and executed in the runtime environment 72 on, for example, any of the workstations 20-23 of FIG. 1. In particular, after a graphical item 74 or a graphic display 76 is created as a class object and is stored in the database 52, that element or display may be instantiated as an actual runtime object and may be executed in the runtime environment 72. As illustrated by the block 86, the instantiation process fills in the bindings that are defined in the objects 74 and 76 (i.e., for the graphic item and display, the properties and the event handler and animation expressions), which may be accomplished using one or more resolution tables that may be loaded with proper variable names, tags, aliases etc. within the process plant or process control system to provide a specific connection between actual entities within the process plant and the graphic objects running on a display device within the plant 10. As part of the binding process, the objects 74 and 76 connect to data sources within the process plant as defined by the resolution table, and thereby gain access to the plant so as to be logically and communicatively connected to the process plant 10.

As illustrated by the blocks 87, a graphical item 74 or a graphic display 76 can be executed in or as part of a number of different functions within the runtime environment 72, including a configuration display, a control operator display, a maintenance display and a simulation display, to name but a few. For example, a specialized animation and event view panel within a configuration display may be used to configure animations that are associated with graphical items, as described below. After configuration, these graphical items may be stored for use within a graphic display 76. Additionally, the display objects 74 and 76 may be used to perform system level functions, e.g., ones that use data from various ones of the functional levels depicted in FIG. 2, including for example, predictive control or predictive maintenance functions, system level error detection, diagnostics, etc. In fact, the displays 76, once created in the configuration environment 70 and stored in the database 52 may be used for a number of different activities. Still further, the display objects 74 and 76 may be executed on any desired display or computer hardware, such as a workstation 90, a laptop computer 91, a handheld device 92, like a personal data assistant (PDA), a telephone device, etc., or any other specialty display 93, such as a large screen display having multiple monitors to display more than one display object 74 and 76 at a time, etc. If desired, a single graphic display 76 may be layered to include one or more views, such as a configuration view, an operator view, a maintenance view, a simulation view, and an animation configuration view, as further described below. Alternatively, separate graphic displays 76 may be configured to provide these separate views using the same or similar graphical items 81, to provide a consistent look and feel across displays created for these various functions.

As illustrated by the block 95, a graphical item 74, or a graphic display 76 may be copied or instantiated, and loaded onto the runtime machine to be ported to the runtime environment 72. Generally speaking, it is desirable that the display object 74 or 76 be bound to the runtime environment 72 only when called up or actually executed on a runtime machine, which is referred to herein as runtime binding. That is, the resolution table for each of the instantiated objects is only filled in or bound to the runtime environment when the display object is actually running or being executed in a runtime computer. This procedure assures that the display object including its visualizations, controls, scripts, etc. only executes and thereby uses processing power when the visualization(s) of the object are actually being rendered on a display screen. Thus, the display object is preferably only bound to the runtime environment 72 when that object is actually running on a runtime computer, which means that the display objects 74 and 76 may be intermittently connected to the runtime environment 72 in a manner defined by the activities of the users viewing the visualizations created by these objects. In particular, these objects may be bound to a runtime environment 72 at the times at which they are required to be viewed, and may be unbound or released when not being viewed by a user, such as when a user minimizes or closes a screen in which these objects are providing a visualization.

The display objects 74 and 76 are thus objects which may be created in a stand-alone environment, i.e., the configuration environment 70, but which may be tied or connected with other objects or data structures defined within the process plant environment or any application running within the process plant environment, including, for example, objects, data structures, applications, etc. defined in any control, simulation, maintenance, or configuration environment. Furthermore, once created, the display objects 74 and 76 may be bound to physical or logical process entities directly, via direct references, variables or tags defined in a resolution table, or indirectly through the use of alias names, variables and parameters, scripts and expressions, which may be resolved either when the display object 74 or 76 is downloaded or instantiated within the a runtime environment 72, or in some cases, when the display object 74 or 76 is actually running within the runtime environment 72.

Figure 4:
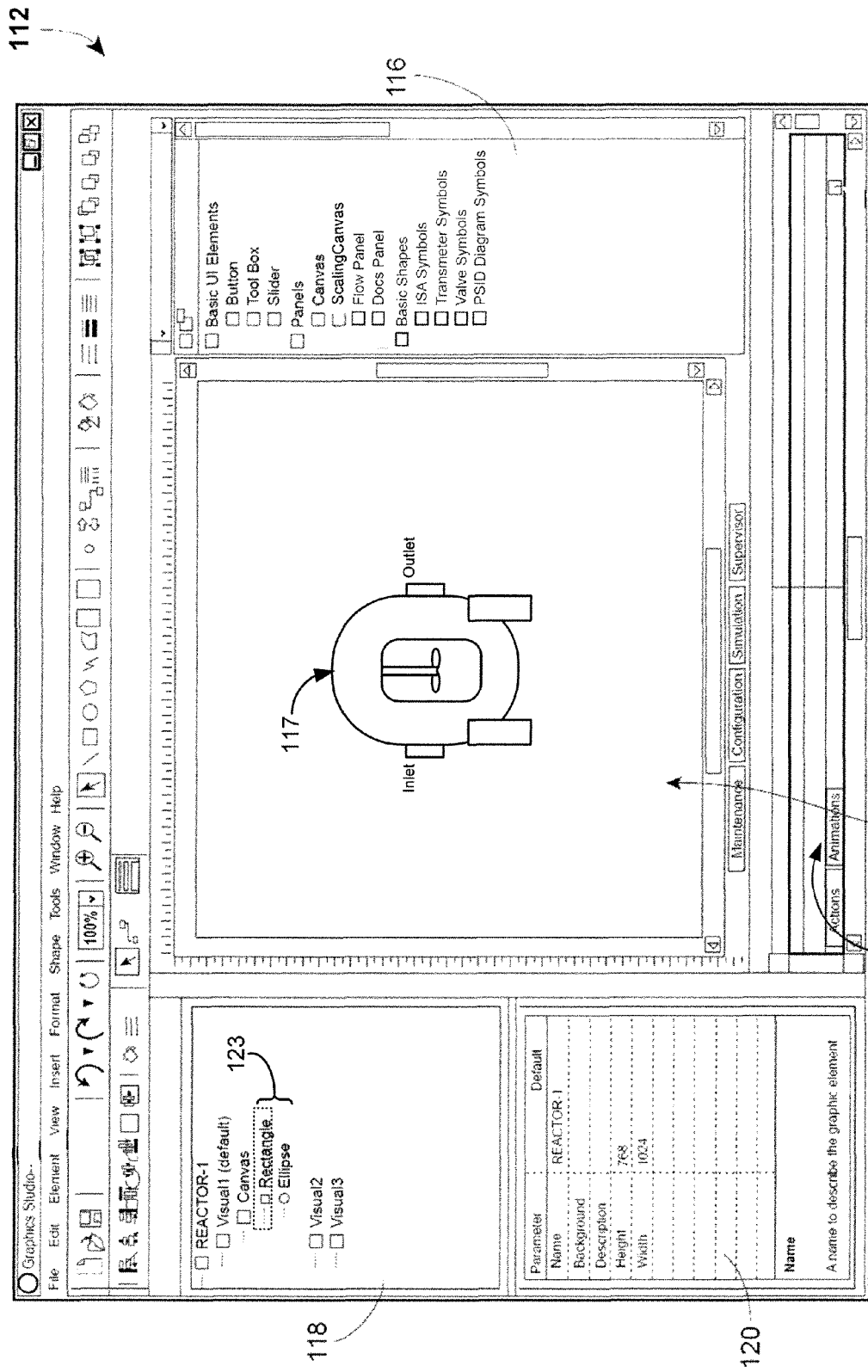
FIG. 4 is a display screen of a graphic display editor showing a plurality of sections including data to facilitate a user's configuration of an operator display.

FIG. 4 illustrates an example screen display 112 that may be created by the editor 50 and used to configure the display object 74 and 76 during configuration or runtime to control the behavior of a graphical item within an operator display. The screen 112, which is depicted in the process of creating a graphical item for a tank, includes a main edit section 114, a pallet view 116, an element hierarchy section 118, and a property definition section 120. The main edit section 114 provides a working space for the user or designer to define, create, and configure a visualization for the graphical item and thus to define the visual properties of the graphical item, in this case a tank illustrated with a visualization 117. Generally speaking, the graphical item 117 created by the editor 50 may be made up of one or more sub-elements 123 or various items that are placed or grouped together in a defined manner. The sub-elements may also be graphical items such that a single visualization may include one or more graphical items as sub-elements. For example, composite graphical items may include one or more simple graphical items such as circles, lines, points, polygons, squares, rectangles, triangles, or other graphic items as sub-elements. The graphical item 117 of the tank depicted in FIG. 4 is one example of a composite graphical item as it includes multiple sub-elements 123. When defined in this manner, separate actions or animations may be applied to or associated with each of the different items making up a graphical item 117, and configured separately or collectively within an animation and event view 134, as further described below. Of course, graphical items may include more elaborate artistic renditions of elements. To define or build up a graphical item, a user or designer may add any number of sub-elements or other graphical items to the main edit section 114 and group these together in any desired manner. Once created, graphical items define the visualization for an actual object, which might be implemented in the runtime as an XAML or WPF object, that will be displayed on a screen or display as a visualization when the graphical item is used in a runtime environment. The items or sub-elements 123 making up the graphical item may be illustrated in a composite hierarchy in the hierarchy section 118.

Figure 5:
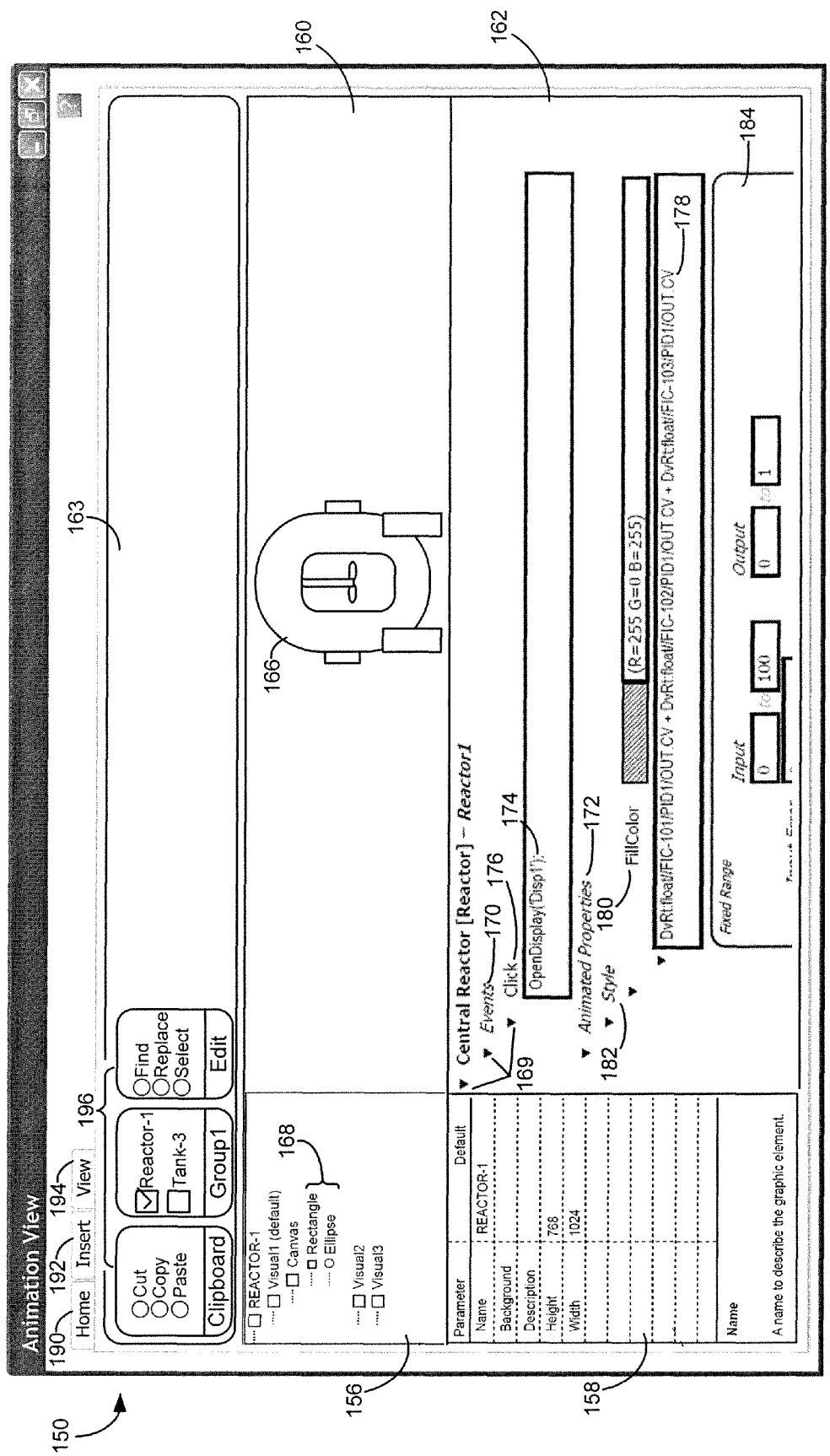
FIG. 5 is one example of an animation view display screen of a graphic display editor showing a plurality of sections including data to facilitate a user's configuration of properties, events, and animations that are associated with an operator display.
Figure 6:
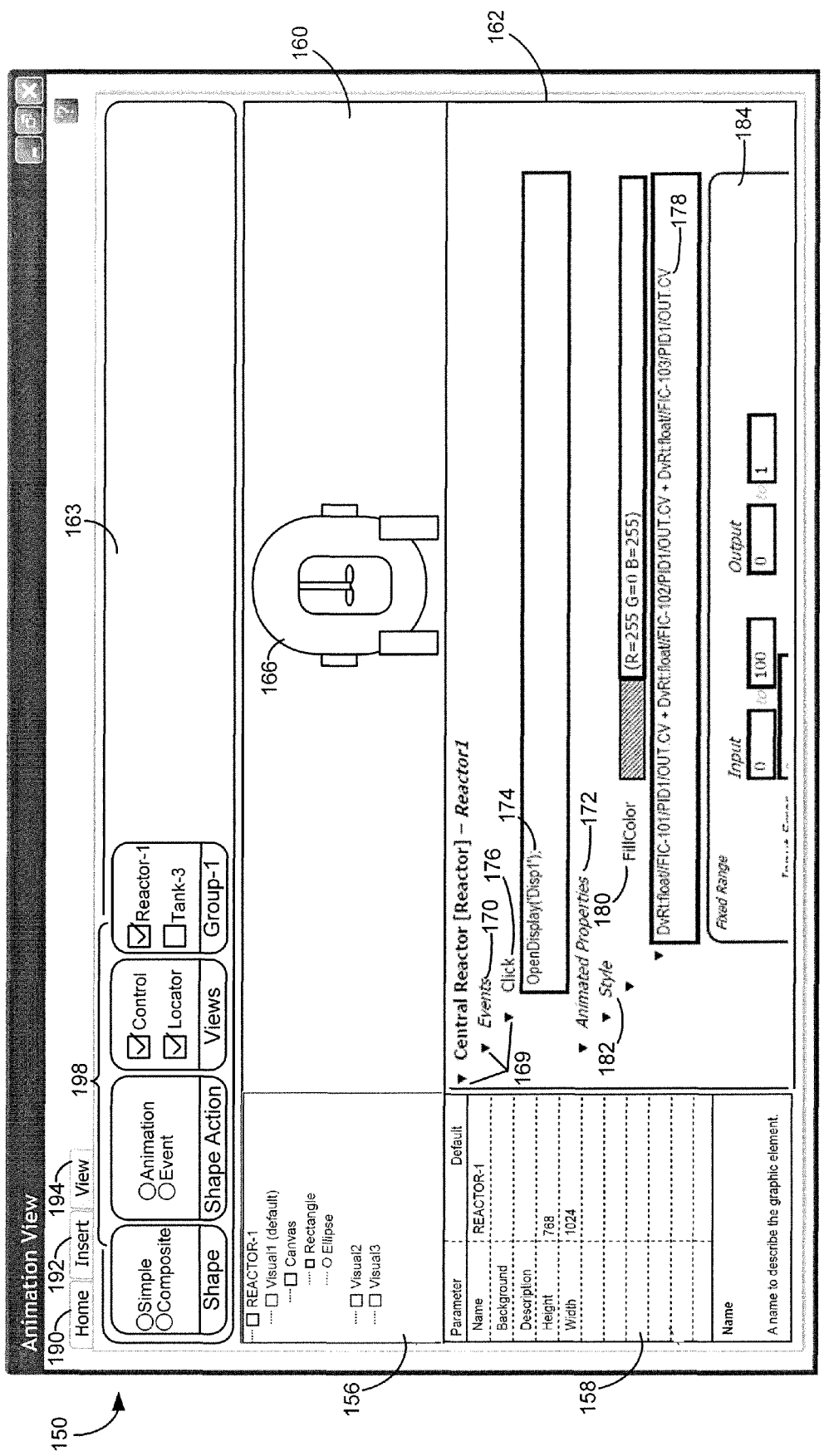
FIG. 6 is a second example of an animation view display screen of a graphic display editor showing a plurality of sections including data to facilitate a user's configuration of properties, events, and animations that are associated with an operator display.

FIGS. 5, 6, and 7 illustrate other examples of a editor 50 (FIG. 2) or animation view 150 that may be used for the configuration of animations. In one embodiment, the animation view is a user interface based on the Microsoft® Office Fluent™ user interface. In other embodiments, the screen display 150 may be accessed by a user or configuration engineer upon selection of an animations tab 134 on the display screen 112 (FIG. 4). In still other embodiments, the display 150 may include all of the functionality of the screen display 112, wherein a functions ribbon and other user-configurable panels, views, and sections, as further described below, may display one or more selectable functions to facilitate creating and editing operator displays. In other words, the display 150 including the functions ribbon and configurable panel sections may replace the display screen 112 that includes its functions in typical a "toolbar" arrangement. Thus, in a "transition of user experience," the display 150 may completely replace the display 112 for the configuration of operator displays. The screen display 150 may also be referred to as an animation view 150. The animation view 150 may include a plurality of panels or sections that are similar or related to the sections or views described above in relation to FIG. 4 (e.g., a tree view 156, a definition section 158, and a diagram section 160) with the addition of an animation pane 162 and a functions ribbon 163.

With reference to FIG. 5, a tree view 156 provides a hierarchical view or a tree structure to display the sub-elements and other minor components of the graphical item 166 that is currently displayed within a diagram section 160. In the example of FIG. 5, the hierarchy section 156 shows that the graphical item 166 currently shown in the diagram section 160 includes sub-elements or primitives 168 of a Rectangle and an Ellipse. While not shown in FIG. 5, the tree view 156 may include indications of animations, events, actions and other display features, such as scripts, visual triggers, etc. defined for the graphical item 166, as further described below.

The property definition section 158, illustrates all of the properties, including intrinsic properties, currently defined for the graphical item 166 shown in the diagram section 160. Any of the graphical items may also be associated with animations, events, and actions which may be shown in an animation pane 162 as well. When visualizations of a graphical item include animations or actions, these animations or actions may be indicated in the tree view 156 with special symbols such as stars, etc. When selected in the tree view 156, any actions or animations defined for a graphical item or a sub-element of a item will be shown in the animation pane 162. Actions, events, or animations may be created and assigned by defining them in the pane 162 or by adding them to the tree view 156. Of course, the actions, events, and animations may be defined using scripts, expressions, visual triggers, or other programs that may be configured within the animation view 150.

The diagram section 160 illustrates the graphical item 166 selected by the user for configuration within the animation view 150. A user may select one or more sub-elements of the graphical item 166 (e.g., the Rectangle and Ellipse sub-elements 168) to display one or more properties, values, events, actions and animations associated with that sub-element. The properties, etc., associated with the selected sub-element may then be displayed within the animation pane 162 and the definition section 158 for configuration, as described below.

The animation pane 162 may include one or more levels 169 of properties for a graphical item 166 displayed within the diagram section 160. Each level may also include one or more sub-levels that are arranged in a hierarchical manner to provide the ability to configure properties that define various visual characteristics, including animation and event properties, that are associated with a graphical item 166. For example, a first level may indicate the graphical item 166 name, while one or more second or sub-levels of the first level may indicate different events 170, animations 172, or other properties that the user may configure. Under each level may be an item further defining the level immediately above it in the hierarchy, for example, an event handler script 174 may be below an event item 176 that is below the event heading 170. Likewise, an animation expression 178 may be positioned below an animation item 180 that is below an animation type 182. In some embodiments, the hierarchical order of the levels 169 may be reversed or configured as desired by a user. For example, a user may wish to only compare a specific level of the properties between two or more graphical items or sub-elements of a displayed graphical item and may reverse or otherwise change the default ordering of the displayed properties associated with those items. This function would allow a user to more easily find and view a specific property name (e.g., the FillColor animation item 180 for both a rectangle and ellipse sub-element of a displayed tank graphical item) and compare a configuration of that property between two or more graphical items or sub-elements.

Each animation item 180 may also include an animation converter 184 that controls how the data accessed or received from the physical or logical entity in the process control plant or system is graphically represented by the animation. For example, the animation converter 184 may control rescaling, converting the data type accessed or received from the physical or logical element to a type that is useful to the animation, looking up a suitable replacement value for the accessed or received data, and converting accessed or received data into a visual representation of the data. In some embodiments, the converter 184 converts data into one or more of a color, a graph, a size of the animation (e.g., a number that indicates that some alarm limit has been exceeded will convert the color of one or more graphical items to red, a slope of a line graph animation item that depicts an output of the process control plant is converted to reflect the current output, a size of a flame graphical item is converted to match a received number that indicates a burner setting), etc. Each level may be configured to appear in the animation pane 162 in a default, selectively defined, or user-defined order. An item may also remain in a persistent position within the animation pane 162, regardless of any modification to the items' order. For example, an "events" item at a second level may remain at a top of the second level listing within the pane 162, regardless of how a user formats or orders the remaining properties that are depicted within the pane 162. A user may also selectively expand and contract each level to display a greater or fewer number of sub-levels, as desired. Other features of the animation pane 162 are described below.

The animation view may also include one or more tabs 190, 192, 194 that, upon selection, may change the number and type of configuration functions available to the user within the functions ribbon 163. In some embodiments, the tabs may include a home tab 190, an insert tab 192, and a view tab 194. A user may selectively switch between the tabs 190, 192, 194 to display different sets of functions within the functions ribbon 163. Upon selection, tabs 190, 192, 194 may change to appear prominently in the screen 150 by, for example, back-shading, changing a color of the tab 190-192, 194, bolding the font of the tab, etc. The user may then choose different animation and event configuration functions to facilitate configuration of an operator display.

The sections of the animation view 150 may be resized, switched on and off, and positioned anywhere within the animation view 150 window, and elements or properties within the view 150 may be collapsed or expanded to conform to user preferences or system requirements. For example, a user may switch off the tree view 156 and the definition section 158. The diagram section 160 and animation pane 162 may automatically resize to display more information to the user upon switching off one or more of the other views, sections, or panels. Further, one or more of the sections 156, 158, 160, 162, and 163 may be selected by a user or configuration engineer to be displayed on a separate monitor or other display device of a workstation within a user's field of view. For example, using a mouse or other pointing device, a user may select and drag the animation pane 162 to a second monitor that is attached to a workstation so that the animation pane 162 or any other section may be visually expanded while the other sections remain in the user's field of view.

With reference to FIG. 5, upon selection of the home tab 190, the functions ribbon 163 may display one or more function sections 196 that may enable the user to select, import, and find a graphical item 166 to be displayed for configuration within the diagram section 160. For example, one or more of the function sections 196 may allow a user to perform clipboard functions such as cut, paste, and copy involving the displayed graphical item 166. Another function section 196 may allow a user to select one or more graphical items that are members of a group of graphical items. The group of graphical items may include sections or areas of a process control plant or a step within a process and each graphical item may visually represent an element within that section. Still further, another function section 196 may allow a user to edit portions of a displayed graphical item, for example, allowing a user to find, replace, or select one or more graphical items 166.

With reference to FIG. 6, upon selection of the insert tab 192, the functions ribbon 163 may display one or more functions sections 198 that may enable a user to associate one or more animations and events with a displayed graphical item 166. For example, one or more of the functions sections 198 may allow a user to insert, edit, or associate one or more values, animation expressions, event handler scripts, and other data with a displayed graphical item 166. One function section may permit a user to insert a selected one of a simple or a composite graphical item. As previously described, composite graphical items may include one or more simple graphical items such as circles, lines, points, polygons, squares, rectangles, triangles, or other graphic items as sub-elements. Another function section may permit a user to select one or more actions or events to be associated with the graphical item 166. For example, the user may select an animation or an event handler script to be associated with a simple or composite graphical item or a sub-element of a composite graphical item. A further function section may permit a user to select various views to facilitate configuration of the displayed graphical item. For example, a control view may permit a user to view all control-related elements associated with the graphical item 166, while a locator view may permit a user to locate one or more properties or elements associate with the graphical item 166. Another function section 198 may allow a user to select one or more graphical items that are members of a group of graphical items. The group of graphical items may include sections or areas of a process control plant or a step within a process and each graphical item may visually represent an element within that section.

Figure 7A:
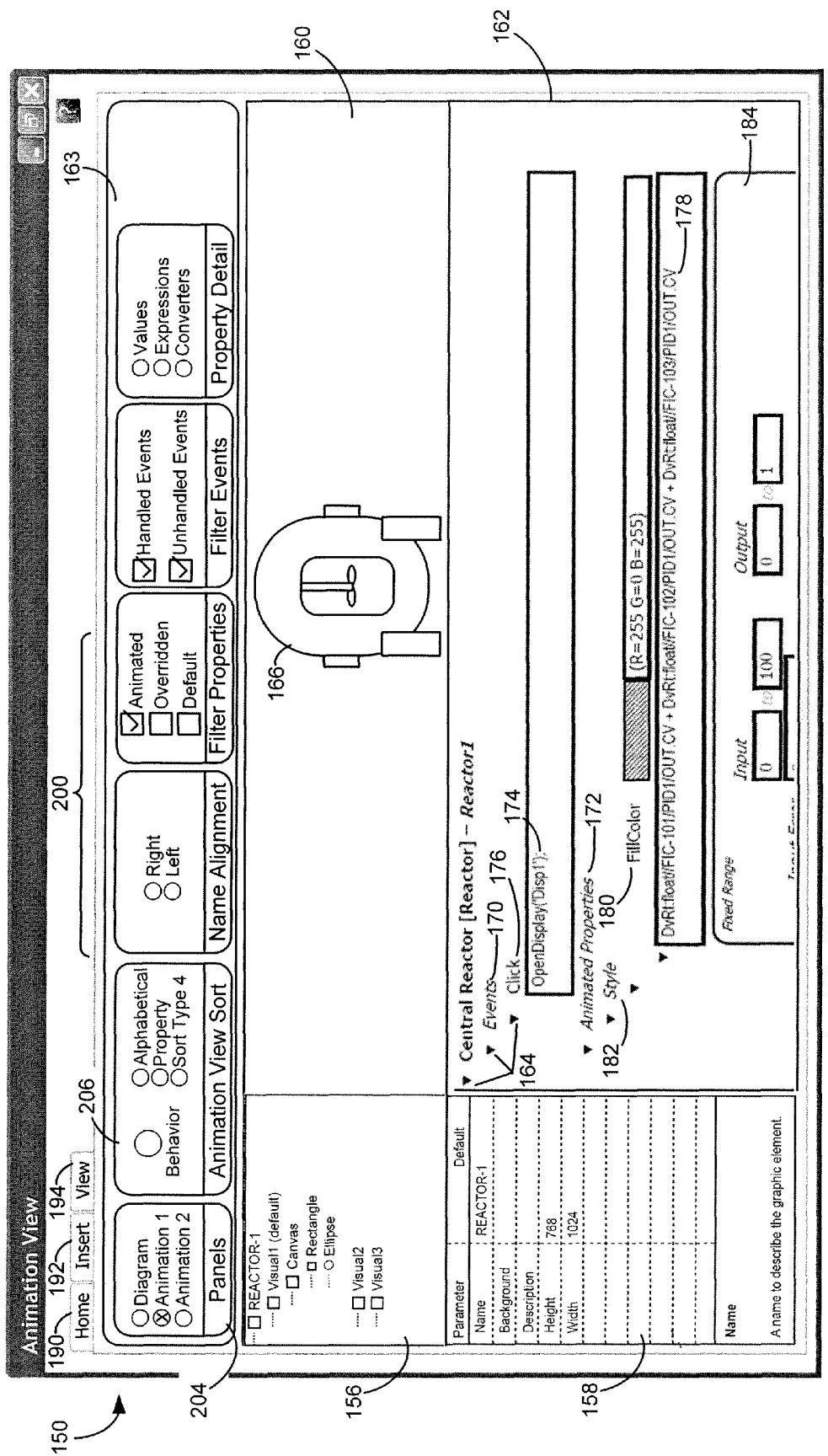
FIGS. 7*a*-7*d* are further examples of an animation view display screen of a graphic display editor showing a plurality of sections including data to facilitate a user's configuration of properties, events, and animations that are associated with an operator display.
Figure 7B:
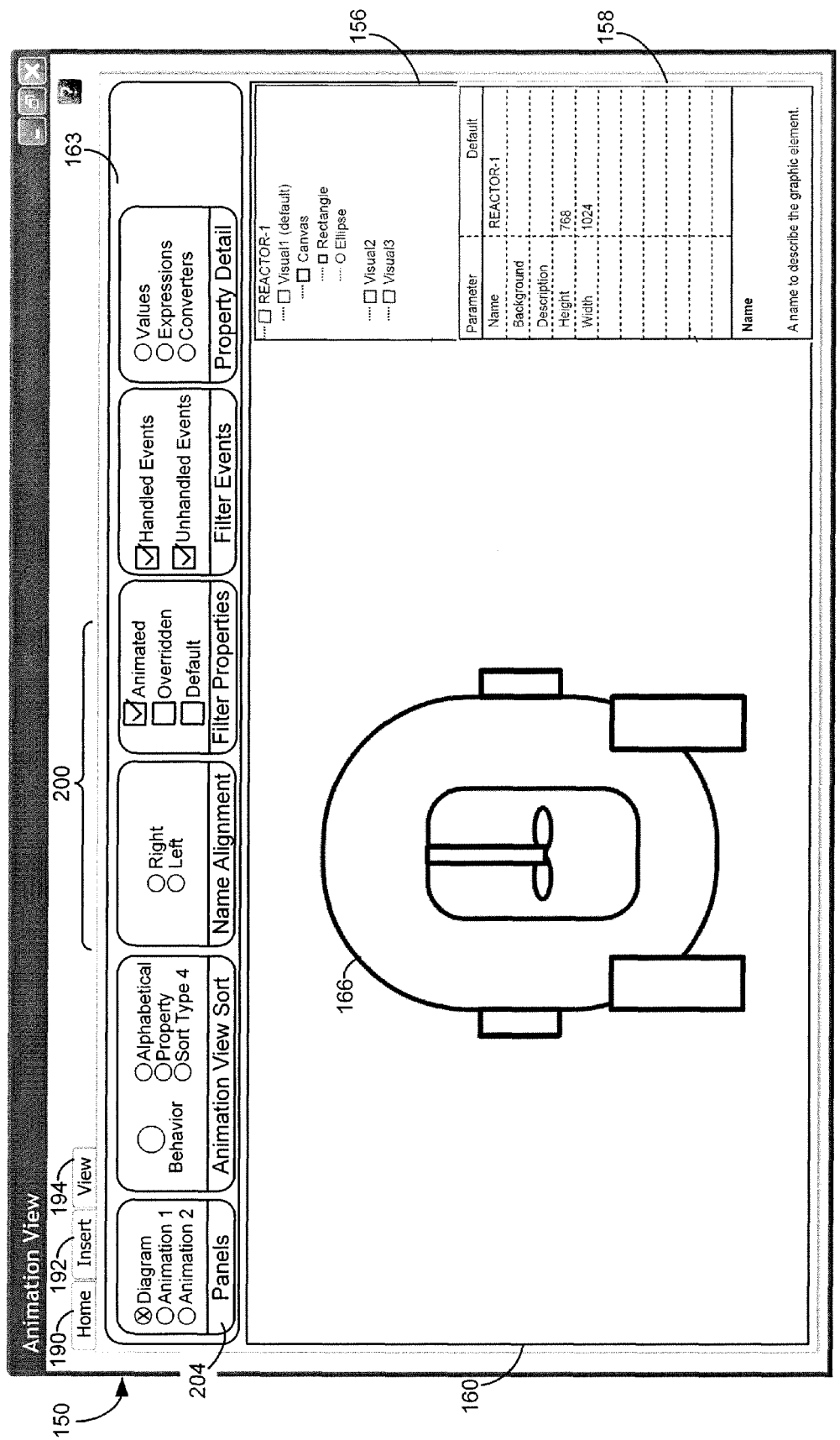
Figure 7C:
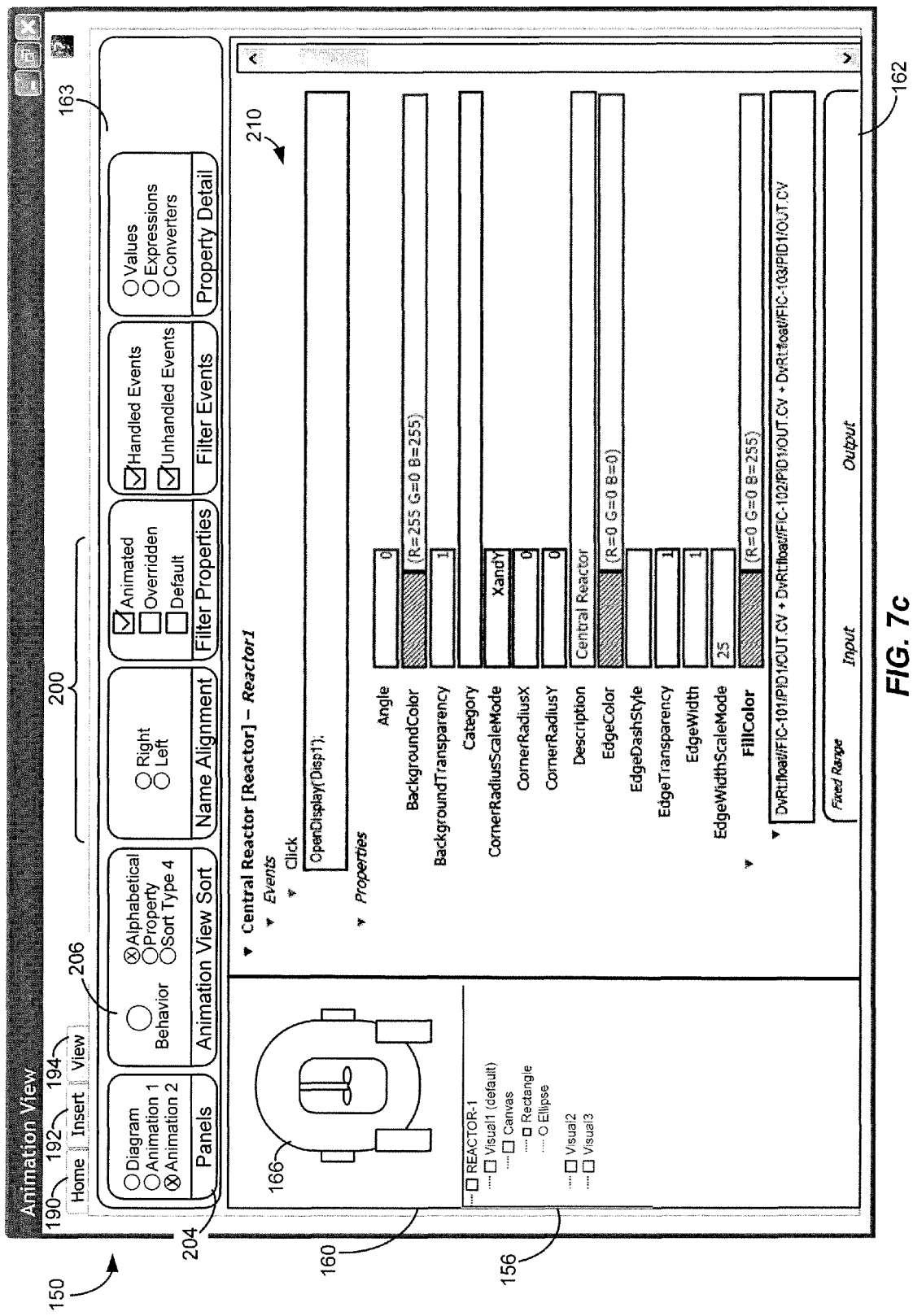

With reference to FIG. 7a, upon selection of a "view" tab 194, the functions ribbon 163 may display one or more functions sections 200 that may enable a user to configure panels within the animation view 150 to view, sort, and configure animations, events, and other parameters associated with the displayed graphical item 166 from the animation pane 162. For example, a panels section 204 may permit a user to configure how one or more panels 156, 158, 160, 162, and 163 are displayed within the animation view 150. In some embodiments, a user may select a first panel view that displays the tree view 156, definitions section 158, diagram section 160, and animation pane 162 within the animation view 150 as illustrated in FIG. 7a. In other embodiments, as illustrated in FIG. 7b, a user may select a second panel view that eliminates the animation pane 162 or other section to make the diagram section 160 the primary focus of the animation view 150. Further, a user may select a third panel view, as illustrated in FIG. 7c, that eliminates a section of the animation view 150 to make the animation pane 162 the primary focus of the animation view 150. Of course, other panel configurations may be available for a user to re-arrange and display the animation view 150 sections 156, 158, 160, 162, and 163 to facilitate configuration of animations and events.

With further reference to FIG. 7c, an animation view sort section 206 may include one or more options to order or sort the information displayed within the animation pane 162. For example, a user may select an alphabetical sort order to sort the items within the animation pane 162 alphabetically. In some embodiments, selection of an alphabetical sort order may reconfigure the items in the animation pane 162 to display one or more graphical item properties 210 in alphabetical order, including any events, event handler scripts, animations, and animation expressions. In other embodiments, one or more animation pane properties 210 may remain at the top of the items list, for example, one or more of events and animations. Of course, a user may sort the properties in a variety of other ways, for example, sort by behavior where the items are displayed according to a degree they have been customized or changed from an original default setting, according to properties 210 where events and animations are removed from the pane 162, or according to a user-defined sort order, etc. Alignment of the properties may also be changed within the animation pane to be, for example, left-, right-, or middle-justified.

Figure 7D:
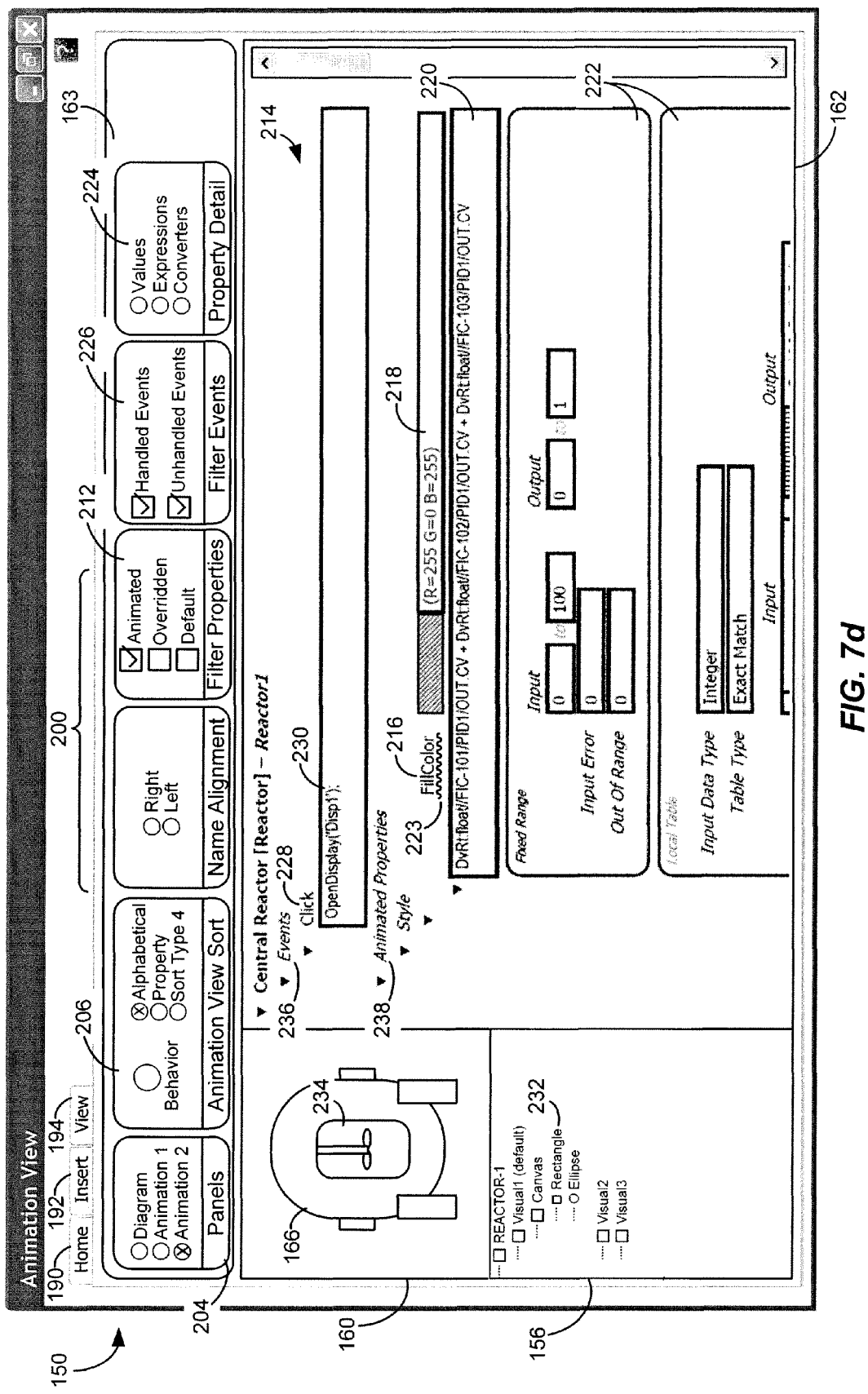

With reference to FIG. 7d, the ribbon 163 may also include a filter properties section 212 that may allow a user to refine the type of properties that are displayed within the animation pane 162. The user may filter the displayed properties according to how much the item has been customized. For example, upon selection of an "animated" filter, the properties items 210 shown in FIG. 7c may be removed from the animation pane 162 and, as shown in FIG. 7d, only those items 214 (e.g., a FillColor property 216 or other animated properties) to which a user added or edited various values and properties associated with the animated property (e.g., the "FillColor" animated property 216 and the associated animation values 218, animation expression 220, and converter 222). An "overridden" filter may change the animation pane 162 to display only those properties that have been changed from their default values and a "default" filter may change the animation pane 162 to display only those properties that have not changed from their default.

In some embodiments, the name of the property displayed within the animation pane 162 may include a visual indication that the property has been changed from its default setting. For example, the name may be displayed in a light blue or other font color if the property includes its default configuration, may be displayed in black if the property has been previously configured, and may be underlined if the property has been overridden or animated, etc. Of course, other visual indications may be associated with default and configured properties, for example, a shaded font, a check mark, "x", font or background color gradients, flashing, glowing, or other visual indication within the immediate visual proximity of the property, etc. Visually modifying the property name to indicate a default, configured, overridden, or animated status may also increase the amount of viewable information within the pane 162 without consuming additional visible space.

Another visual indication may be assigned to a property that has or has not been identified or validated as being associated with a properly configured or functioning control strategy. As previously described, a controller 12 (FIG. 1), stores and executes a controller application that implements a control strategy using any number of different, independently executed, control modules or blocks 29. The animation view may gather information from the configuration database 28 or other information within the process control plant 10 to indicate that one or more of the properties associated with a control strategy has or has not been validated. In one embodiment, an animated property 216 (FIG. 7d) name is underlined 223 in an easily identifiable way to indicate that the property is not associated with a validated control strategy. Other properties that are associated with validated control strategies may not include the underline. Further, the animation view 150 may gather information to determine and identify which specific lower-level properties under a property associated with an invalid control strategy are the cause of the higher-level property being underlined 223. The underline 223 or other identification may also indicate that the property could not be automatically validated by data within the configuration database 28 or other data within the plant 10. If a property is associated with an invalid or unconfirmed control strategy, a user may then investigate and resolve the problem.

The ribbon 163 may also include a property detail section 224 that may allow a user to selectively display one or more properties associated with an animated property. For example, upon selection of a "values" filter, only the values 218 associated with each animation property 214 may be displayed in the pane 162, while removing both the expressions 220 and converters 222. Likewise, selection of one or more of an "expressions" or "converters" filter may remove the values 218 and converters 222 or values 218 and expressions 220, respectively, from the animation pane 162. The ribbon 163 may include a filter events section 226 that, when selected by the user, may change the amount or type of events 228 displayed within the pane 162. For example, one or more events may include an event handler script 230, as described above, that determines how the graphical display changes at runtime in response to certain user actions. An event 228 that includes an event handler script 230 may also be called a "handled event." Thus, if a user selects a "handled events" filter item from the filter events section 226, the pane 162 may change to only display those events 228 that include one or more event handler scripts 230. Likewise, if a user selects an "unhandled events" filter item from the filter events section 226, the pane 162 may change to display only those events that do not include an event handler script 230.

In addition to the functions described above, the user may select one or more sub-elements of the graphical item 166 to view and edit only the properties associated with the selected sub-elements. The user may select one or more sub-elements for configuration within the animation pane 162 from one or more of the tree view 156 and the diagram section 160, or directly from the animation pane 162. For example, a user may select a rectangle sub-element 232 from the tree view 156 or the user may select the rectangle sub-element 234 depicted in the diagram section 160. In some embodiments, once a user selects of one or more graphical items from the tree view 156 or the diagram section 160, one or more of the animation properties corresponding to the selected item may appear in the animation pane 162. Therefore, the properties corresponding to the selected item may be immediately available in the animation pane 162 for viewing, modification, configuration, or other actions, and may be sorted and filtered according to one or more functions 200. After selection of the graphical item 166 or sub-elements of the graphical item from either the tree view 156, the diagram section 160, or the animation pane 162, the user may filter, sort, and group the properties associated with his or her selection, as previously described.

Once displayed within the animation pane 162, the user may configure one or more events 236 and animation properties 238. Thus, using various functions associated with the sections 200 of the ribbon 163, a user may selectively view and configure various properties of the graphical item 166. The ability to selectively view and configure each property may facilitate configuring animations and other properties of the graphical item 166 for runtime display. For example, to modify a converter 240, a user need only select the "converter" filter from the property detail section 224 to quickly display all converter items associated with the graphical item displayed in the diagram section 160, or first select a sub-element 232, 234 of the graphical item 166 from the tree view 156 or the diagram section 160 to display the properties associated with the selected item in the animation pane 162, find the desired converter 222, and perform one or more configuration tasks. Modification of one or more event handler scripts 230 and the values 218 and expressions 220 of an animation property 238 may be facilitated by using the filtering, sorting, and grouping functions that are accessible from the ribbon 163, as described above. For example, by filtering the properties within the animation pane 162 to display only the animated properties 238, a user may be able to view several animation expressions 220 corresponding to several animation properties 238. The user may then easily use the expression of one displayed animation expression to configure the animation expression of another displayed animation property. Likewise, the user may employ the cut and paste functions described above in relation to FIG. 5 to provide a starting point to modify one or more events 236 and animated properties 238.

The values, expressions, and scripts for each user-configurable property may also be selected and transferred between same-named properties that are on different composite shapes or within the same composite shape. The user may make the transfer by selecting a user-configurable property or field name (e.g., a "mouse down" action on the "FillColor" property name), dragging the selected property to another "FillColor" property field for the same or a different shape, and drop the selected values into the other property. This simplified transfer of values avoids the typical actions of selecting the values within a field and typing new values, or complex text selection actions (e.g., mouse down, drag to select text, mouse up, followed by mouse down, drag to other field, and finally drop) typically used to edit or configure the properties. Further, where the values for two properties are the same format (e.g., in FIG. 7c, the properties BackgroundColor, EdgeColor, and FillColor are all some combination of R, G, and B values), a user may select and drag the same-formatted properties between properties with different names to copy and transfer the values between the fields.

Figure 8:
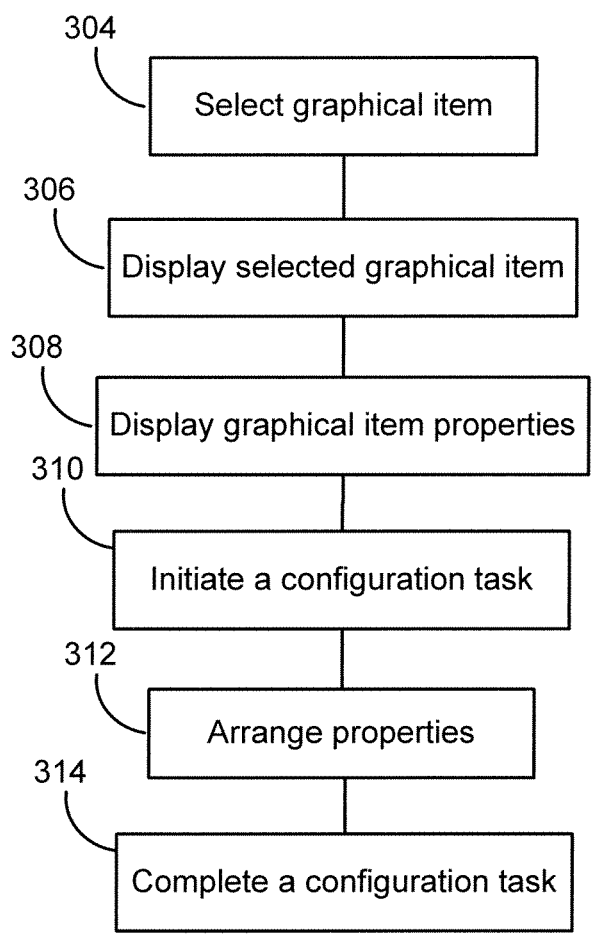
FIG. 8 is a block diagram illustrating one manner in which the configuration of properties, events, and animations for operator displays may be facilitated using functions associated with an animation view of a graphic display editor.

With reference to FIG. 8, a method 300 describes one or more function blocks that, in conjunction with the animation view 150 (FIGS. 5-7d), facilitates the configuration of graphical items 166 for process plant workstation operator displays. The method 300 may be employed during configuration of one or more graphic displays or items, or in a runtime environment. The function blocks of the method 300 may be performed while viewing the properties of the graphical item as a whole, or viewing the properties associated with only one or more sub-elements.

At block 304, a user or configuration engineer may, at configuration or runtime, select one or more graphical items 166 from a library of items. In some embodiments, the library of graphical items is stored in a database 52 (FIG. 2) that is accessible through an editor 50 (FIG. 2) and an animation view 150. The editor 50 and the animation view 150 may display a list of all the graphical items available to the user for creating or configuring an operator display, or the listing may be sorted or filtered according to the configuration task the user is trying to accomplish. For example, if a user or engineer is creating or configuring an operator display related to a petroleum refining process plant, the listing may display graphical items from the library that are generally tailored to petroleum-related plants and processes.

At block 306, the method 300 may display the selected graphical item in a first section of an editor display screen 112 (FIG. 4) or the animation view 150 (FIG. 5, 6, 7). The first section may include one or more of a main edit section 114 of the editor display screen 112, a diagram view 160 of an animation view 150, or another section or panel that is viewable by the user or engineer during configuration of values, events, animations, and other properties of the selected graphical item. The first section may also be displayed on a second monitor or other display of the workstation that is visually proximate to, but physically separate from, any remaining sections of the animation view 150 or editor display 112. The selected graphical item may also display one or more sub-elements. These sub-elements are also individually selectable by the user or configuration engineer, but may remain bound to the parent graphical item, as described above.

At block 308, the method may display a listing of properties of the selected graphical item in a second section of an editor display screen 112 (FIG. 4) or the animation view 150 (FIGS. 5-7). The second section may include one or more of an animation pane 162 or a definitions section 158 of the animation view 150, or other section. The second section may be viewed by the user or engineer during configuration of values, events, animations, and other properties of the selected graphical item. The second section may also be displayed on a second monitor or other display of the workstation that is visually proximate to, but physically separate from, any remaining sections of the animation view 150. As described above, the animation pane 162 displaying the graphical item properties may be viewed by a user or configuration engineer to facilitate configuration. Additionally, the second section may display properties of a selected sub-element, rather than the properties of the entire graphical item. For example, with reference to FIG. 7d, if a rectangle sub-element 234, 232 of the graphical item 166 is selected by a mouse click or other method, then the animation pane 162, may only display the properties (e.g., values, events handler scripts, animation expressions, converters, etc.) that are associated with that selected rectangle sub-element. More than one sub-element may also be selected and the properties of the selected, multiple sub-elements may be displayed in the animation pane, as well.

At block 310, the user, configuration engineer, or automated process may initiate a configuration task to edit or modify the properties of a graphical item and its sub-elements to more accurately visualize a process control plant and system within an operator display of a workstation. A configuration task may include one or more of editing an event handler script, editing an animation expression, editing a value of one or more properties associated with a graphical item and its sub-elements, etc. A configuration task may be initiated by a user or automated process following a design plan for the operator display that includes ensuring that the graphical items are each correctly or accurately bound to the physical or logical entity of the process control plant that they visually represent. For example, a configuration task may include ensuring that a value 218, animation expression 220, converter, or other property of a FillColor animated property 216 that is associated with a selected graphical item accurately follows a design plan for an operator display that includes the item.

At block 312, the method 300 may arrange the properties within the animation pane 162 to facilitate completion of the configuration task. In one embodiment, a user may sort and filter the properties within the animation pane 162 to display those properties that are most important to a configuration task the user is currently performing. The user may arrange the properties by initiating one or more functions from a functions ribbon 163 that displays various filtering and sorting options to the user or engineer. Additionally or alternatively, an automated process may initiate one or more functions to automatically arrange the properties within the animation pane 162 according to a configuration task. For example, with reference to FIG. 7d, to complete a configuration task that includes modifying a value 218, animation expression, or other property of the FillColor animated property, a user or process may arrange the animations by initiating a function to alphabetically sort them so that an animation beginning with the letter "F" may be found more easily. Of course, various functions within the ribbon 163 (e.g., sorting and filtering according to how much a property has been previously modified, by behavior, by animations or events, etc., as described above) may arrange the properties in a variety of ways to facilitate completion of the configuration task. The one or more functions that arrange the properties may be initiated from the functions ribbon to expand or reduce the amount and type of properties displayed in the animation pane 162 so that properties requiring configuration may be discovered more easily by a user or configuration engineer to complete configuration tasks.

At block 314, the user, configuration engineer, or automated process may complete the configuration task initiated at block 310. For example, with reference to FIG. 7d, to complete a configuration task that includes modifying a value 218, animation expression, or other property of the FillColor animated property, a user may view the properties arranged in alphabetical order so that an animation beginning with the letter "F" may be found more easily. The user or process may then edit the FillColor property to complete the configuration task that was facilitated by arranging the properties within the animation pane 162. Any of the function blocks 304-314 may be repeated as necessary to complete any configuration task.

Therefore, an animation view 150 may include one or more functions to sort, filter, and view the properties associated with a graphical item 166 within an animation pane 162. Configuration of the graphical item properties may be facilitated by eliminating the user dialogs that are typically associated with each event and animation property of a graphical item 166. By hierarchically displaying various levels and orderings of events, animations, and properties, a user may view the properties in an order or as a group that corresponds to the particular configuration task the user is trying to accomplish. For example, filtering and grouping all event items together may eliminate the need for a user to perform a scroll action within an animation pane 162 to view more than one related event. Likewise, expanding or collapsing one or more levels of the properties displayed within the animation pane 162 may increase or decrease the number and type properties displayed so that a user may quickly find and configure one or more desired properties. Of course, the same sorting, filtering, grouping, and display level actions may be performed with any of the properties associated with a graphical item 166 or sub-element 234 to facilitate user configuration.

The hierarchical and progressive display of properties associated with the graphical items facilitates the configuration task the user is trying to accomplish. For example, the user may be able to see and configure all property overrides, animation expressions, and events or configure multiple properties of one or more graphical items and its sub-elements without opening and dismissing multiple property dialogs. Grouping, ordering, sorting, and filtering the graphical item properties may also facilitate comparing the properties among the various items and sub-elements. Printing these sorted items to a file that may depict the properties as viewed in the animation pane may be used as a support document for an end user to view and understand the hierarchical relationship among the properties of each graphical item. The animation pane 162 view may also be provided to a workstation operator at runtime to allow the operator to view plant and process data in various formats, for example, as batch data or AMS™ device data.

The concepts described above may also be applied to configuration of DeltaV™ Control Strategies within a control strategy editor having one or more organization and presentation characteristics of the animation view 150. Providing a cohesive control strategy view that is similar to the animation view 150 may allow the user to organize and view control strategy information to complete a configuration task. For example, when configuring a Sequential Function Charting (SFC) algorithm, a user may organize and view multiple step's actions with details such as type, delay, animation expressions, and transition expressions without having to open and dismiss dialogs for each step's actions or transitions.

When implemented, any of the software and functions described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A graphical editor stored in a memory and including instructions executed by a processor for use in a process plant to configure animations and events for operator interface displays, the editor comprising:
   a library of graphical items stored in the memory, wherein each graphical item includes a plurality of user-configurable properties associated with a physical or a logical entity within the process control plant;
   a first section displaying a graphical item in response to execution of an instruction;
   a second section hierarchically displaying the user-configurable properties corresponding to the graphical item in response to execution of the instruction; and
   a third section displaying a plurality of user-selectable functions stored in the memory and executable by the processor to change an arrangement of the user-configurable properties hierarchically displayed in the second section, which correspond to the graphical item displayed in the first section, in order to facilitate completion of a graphical item configuration task;
   wherein one or more of the plurality of user-selectable functions are configured to determine a degree of change from an original default setting for each of the displayed user-configurable properties and sort the displayed user-configurable properties within the second section based on the degree of change from the original default setting, and the first, second, and third sections are displayed simultaneously.

2. The graphical editor of claim 1, wherein one or more of the plurality of user-selectable functions are configured to:
   filter the user-configurable properties to display, within the second section, fewer than a total number of the properties associated with the graphical item.

3. The graphical editor of claim 2, wherein the user-configurable properties include events and animations.

4. The graphical editor of claim 3, wherein each event includes a user-configurable event handler script.

5. The graphical editor of claim 3, wherein each animation includes an animation expression, a value, and a converter, the animation expression including an instruction to transform the graphical item within the first section according to the value and data accessed from a physical or logical device of the process control plant, and the converter including a function executed by the processor to change the accessed data to a data type used by the animation expression.

6. The graphical editor of claim 3, wherein each filtered user-configurable property displayed within the second section includes only those properties having a value.

7. The graphical editor of claim 3, wherein each filtered user-configurable property displayed within the second section includes only those properties having a converter.

8. The graphical editor of claim 2, wherein each filtered user-configurable property displayed within the second section includes only those properties having a user-configured animation property.

9. The graphical editor of claim 2, wherein each filtered user-configurable property displayed within the second section includes only those properties having a changed default property value.

10. The graphical editor of claim 2, wherein each filtered user-configurable property displayed within the second section includes only those properties having a default property value.

11. The graphical editor of claim 2, wherein the selected sort order is alphabetical by name including all properties included with the graphical item, alphabetical by name including properties selected from the group consisting of events, animated properties, or properties, all properties included with the graphical item ordered by a degree the property has been changed from a default value, or a user-defined sort order.

12. The graphical editor of claim 2, wherein each user-configurable property displayed within the second section includes an indication that either the property has been changed from its default setting or the property has not been changed from its default setting.

13. The graphical editor of claim 12, wherein the indication includes one or more of a font color, a symbol, an underline, a bolded font, a shaded font, a font color gradient, a background color gradient, glowing, and flashing.

14. The graphical editor of claim 1, wherein the graphical item includes one or more sub-elements.

15. The graphical editor of claim 14, wherein each sub-element includes one or more user-configurable properties.

16. The graphical editor of claim 1, wherein the user-configurable properties include control strategy properties.

17. The graphical editor of claim 1, further comprising an interface between a process control plant operator workstation and the second section, the interface configured to communicate the hierarchical display of the user-configurable properties to the workstation.

18. A method of configuring an animation or event for a graphical representation of process control plant entity in a process control plant operator display, the method comprising:
   displaying, in a diagram view of an animation view editor, a selected graphical item including a visual representation of a physical or a logical entity within the process control plant and one or more sub-elements having user-configurable properties for one or more of the animation or the event;
   hierarchically displaying the one or more user-configurable properties of the selected graphical item in an animation pane of the editor;
   determining a degree of change from an original default setting for each of the displayed user-configurable properties;
   sorting the displayed user-configurable properties in the animation pane upon selection of a function displayed in a functions ribbon to facilitate completion of a configuration task, wherein the sorting is based on the degree of change from the original default setting.

19. The method of claim 18, wherein the one or more user-configurable properties includes one or more of an event handler script, an animation expression, an animation value, an animation converter, and a property value.

20. The method of claim 19, wherein determining a degree of change from an original default setting for each of the displayed user-configurable properties includes initiating one or more functions to display user-configurable properties that are related to the graphical item configuration task.

21. The method of claim 20, wherein the one or more functions include one or more of sorting or filtering the user-configurable properties displayed in the animation pane to facilitate completion of the configuration task.

22. The method of claim 21, wherein each filtered user-configurable property displayed within the animation pane includes only those properties having a value.

23. The method of claim 21, wherein each filtered user-configurable property displayed within the animation pane includes only those properties having a converter.

24. The method of claim 21, wherein each filtered user-configurable property displayed within the animation pane includes only those properties having a changed default property value from an original default setting of the property.

25. The method of claim 21, wherein each filtered user-configurable property displayed within the animation pane includes only those properties having a default property value.

26. The graphical editor of claim 19, wherein each animation expression includes data accessed from a physical or logical device of the process control plant.

27. The method of claim 18, wherein the user-configurable properties include one or more of an event handler script, an animation value, an animation expression, or an animation converter.

28. The method of claim 18, further comprising completing the configuration task, wherein the task includes one or more of editing the event handler script, editing the animation value, editing the animation expression, or editing the animation converter.

29. The method of claim 18, further comprising printing the user-configurable properties displayed in the animation pane after completing the configuration.

30. The method of claim 18, wherein each user-configurable property displayed within the animation pane includes an indication that the property has been changed from its default setting.

31. The method of claim 30, wherein the indication includes one or more of a font color, a symbol, an underline, a bolded font, a shaded font, a font color gradient, a background color gradient, glowing, and flashing.

32. The method of claim 18, wherein the one or more user-configurable properties include control strategy properties.

33. The method of claim 18, further comprising displaying the user-configurable properties at a process control plant operator workstation.

34. A computing system including a display and a graphical editor including a configuration module stored in a memory and including instructions executed by a processor for configuring animation and event properties of graphical items displayed at an operator workstation of a process control plant, the configuration module including instructions that, upon execution, cause the processor to:
display a selected graphical item in a diagram view of a graphical item editor, the selected graphical item including a visual representation of a physical or a logical entity within the process control plant and one or more sub-elements having user-configurable properties;
hierarchically display the user-configurable properties of the selected graphical item in an animation pane of the editor;
determine a degree of change from an original default setting for each of the displayed user-configurable properties;
sort, based on the degree of change from the original default setting, the displayed user-configurable properties in the animation pane upon selection of a function displayed in a functions ribbon to facilitate completion of a configuration task; and
store the configured graphical item;
wherein the user-configurable properties include one or more of an event handler script, an animation expression, an animation value, an animation converter, and a property value.

35. The computer system of claim 34, wherein the module is further configured to initiate a function to display user-configurable properties that are related to the configuration task.

36. The computer system of claim 34, wherein the instruction to determine the degree of change from the original default setting for each of the displayed user-configurable properties further includes one or more instructions to sort and filter the user-configurable properties displayed in the animation pane to facilitate completion of the configuration task.

37. The computer system of claim 36, wherein each filtered user-configurable property displayed within the animation pane includes only those properties having a value.

38. The computer system of claim 37, wherein each filtered user-configurable property displayed within the animation pane includes only those properties having an animation expression.

39. The computer system of claim 36, wherein each filtered user-configurable property displayed within the animation pane includes only those properties having a converter.

40. he computer system of claim 36, wherein each filtered user-configurable property displayed within the animation pane includes only those properties having a changed default property value from an original default setting of the property.

41. The computer system of claim 36, wherein each filtered user-configurable property displayed within the animation pane includes only those properties having a default property value.

42. The computer system of claim 36, wherein each animation expression includes data accessed from a physical or logical device of the process control plant.

43. The computer system of claim 34, wherein the module is further configured to complete the configuration task, wherein the task includes one or more of editing the event handler script, editing the animation value, editing the animation expression, or editing the animation converter.

44. The computer system of claim 34, wherein the module is further configured to print the user-configurable properties displayed in the animation pane after completing the configuration.

45. The computer system of claim 34, wherein each user-configurable property displayed within the animation pane includes an indication that the property has been changed from its default setting.

46. The computer system of claim 45, wherein the indication includes one or more of a font color, a symbol, an underline, a bolded font, and a shaded font.

47. The computer system of claim 34, wherein the user-configurable properties include control strategy properties.

48. The computer system of claim 34, wherein the module is further configured to display the user-configurable properties at a process control plant operator workstation.

* * * * *